United States Patent
Jaster et al.

(10) Patent No.: US 11,316,413 B2
(45) Date of Patent: Apr. 26, 2022

(54) CONNECTION BETWEEN A WINDING AND A CIRCUIT BOARD

(71) Applicant: Continental Automotive GmbH, Hannover (DE)

(72) Inventors: Magnus Jaster, Kirchmöser (DE); Robert Krause, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 590 days.

(21) Appl. No.: 16/074,010

(22) PCT Filed: Jan. 26, 2017

(86) PCT No.: PCT/EP2017/051694
§ 371 (c)(1),
(2) Date: Jul. 30, 2018

(87) PCT Pub. No.: WO2017/133961
PCT Pub. Date: Aug. 10, 2017

(65) Prior Publication Data
US 2019/0044420 A1   Feb. 7, 2019

(30) Foreign Application Priority Data
Feb. 1, 2016   (DE) .................. 10 2016 201 447.1

(51) Int. Cl.
*H02K 11/27*   (2016.01)
*H02K 11/33*   (2016.01)
(Continued)

(52) U.S. Cl.
CPC .............. *H02K 11/33* (2016.01); *H02K 3/50* (2013.01); *H02K 11/25* (2016.01); *H02K 11/27* (2016.01); *H02K 2211/03* (2013.01)

(58) Field of Classification Search
CPC . H02K 3/00; H02K 3/50; H02K 11/00; H02K 11/04; H02K 11/048; H02K 11/25; H02K 11/27; H02K 11/30; H02K 11/33
See application file for complete search history.

(56) References Cited

U.S. PATENT DOCUMENTS

| 3,862,492 A | * | 1/1975 | Crabb | ................... H02K 3/325 29/596 |
| 5,073,735 A | * | 12/1991 | Takagi | .................... H02K 5/04 310/71 |

(Continued)

FOREIGN PATENT DOCUMENTS

| DE | 102007016255 A1 | 11/2007 | ............. F04D 13/06 |
| DE | 102012013466 A1 | 2/2013 | ............... G01K 1/16 |

(Continued)

OTHER PUBLICATIONS

Chinese Office Action, Application No. 201780009230.6, 16 pages, dated Aug. 1, 2019.

(Continued)

*Primary Examiner* — Tran N Nguyen
(74) *Attorney, Agent, or Firm* — Slayden Grubert Beard PLLC

(57) ABSTRACT

Various embodiments may include a connection between a winding for an electric machine and a circuit board for an inverter including a connection between the winding and a circuit board for an inverter. A coil end piece of the stator winding extends in a first direction and is welded or connected in a form-fitting manner directly to the circuit board on which a power output stage of the inverter is located.

7 Claims, 1 Drawing Sheet

(51) Int. Cl.
*H02K 3/50* (2006.01)
*H02K 11/25* (2016.01)

(56) References Cited

U.S. PATENT DOCUMENTS

| | | | | |
|---|---|---|---|---|
| 5,153,506 | A * | 10/1992 | Trenkler | G01K 7/20 324/545 |
| 5,341,077 | A * | 8/1994 | Chen | H02H 7/0833 318/434 |
| 5,483,141 | A * | 1/1996 | Uesugi | F25B 49/025 318/811 |
| 5,534,788 | A * | 7/1996 | Smith | G01R 1/203 324/431 |
| 6,225,684 | B1 * | 5/2001 | Stitt, II | H01L 23/495 257/666 |
| 6,236,110 | B1 * | 5/2001 | Muto | G01R 1/20 257/724 |
| 6,873,072 | B2 | 3/2005 | Ganter et al. | 310/68 R |
| 8,282,367 | B2 | 10/2012 | Ihle et al. | 417/423.8 |
| 2002/0033646 | A1 * | 3/2002 | Tanaka | H02K 11/046 310/71 |
| 2003/0173839 | A1 * | 9/2003 | Torii | H02K 11/33 310/52 |
| 2004/0135440 | A1 * | 7/2004 | Higashino | H02K 7/04 310/51 |
| 2004/0145261 | A1 * | 7/2004 | Ganter | H02K 3/50 310/91 |
| 2005/0236921 | A1 * | 10/2005 | Yoneda | H02K 3/522 310/179 |
| 2005/0275296 | A1 * | 12/2005 | Kumakura | H02K 3/505 310/71 |
| 2007/0246636 | A1 * | 10/2007 | Katayama | B60L 50/15 248/637 |
| 2015/0333602 | A1 | 11/2015 | Mohr | 310/54 |

FOREIGN PATENT DOCUMENTS

| | | | |
|---|---|---|---|
| DE | 102012204241 A1 | 9/2013 | H02K 11/00 |
| JP | 2008211945 A | 9/2008 | H02K 5/22 |
| JP | 2009248864 * | 10/2009 | H02K 11/33 |
| JP | 2011250545 A | 12/2011 | F24F 7/013 |
| JP | 4877265 B2 | 2/2012 | B62D 5/04 |
| WO | 03/001646 A1 | 1/2003 | H02K 11/33 |
| WO | 2017/133961 A1 | 8/2017 | H02K 11/25 |

OTHER PUBLICATIONS

German Office Action, Application No. 102016201447.1, 5 pages, dated Oct. 26, 2016.

International Search Report and Written Opinion, Application No. PCT/EP2017/051694, 18 pages, dated Apr. 5, 2017.

* cited by examiner

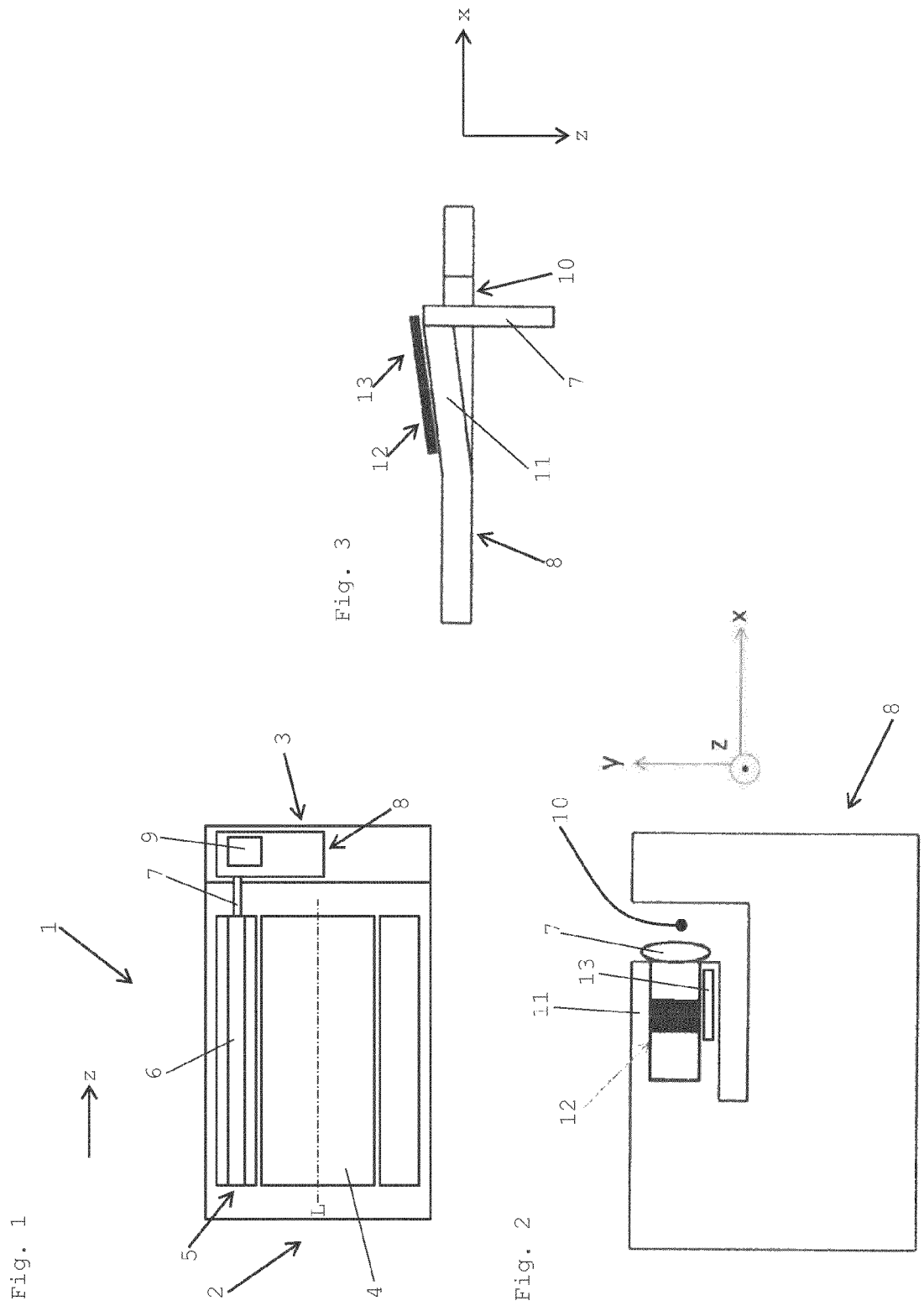

US 11,316,413 B2

CONNECTION BETWEEN A WINDING AND A CIRCUIT BOARD

CROSS-REFERENCE TO RELATED APPLICATIONS

This application is a U.S. National Stage Application of International Application No. PCT/EP2017/051694 filed Jan. 26, 2017 which designates the United States of America, and claims priority to DE Application No. 10 2016 201 447.1 filed Feb. 1, 2016, the contents of which are hereby incorporated by reference in their entirety.

TECHNICAL FIELD

The present disclosure relates to electric machines. Various embodiments may include a connection between a winding, e.g. a stator winding or rotor winding, for an electric machine and a circuit board for an inverter.

BACKGROUND

Hybrid systems including electric machines typically comprise an electric motor and an inverter separated from the electric motor, where the electric motor and the inverter are connected to one another by cables. Hybrid systems with integrated solutions are also known, in which the electric motor and the inverter are integrated in a common housing.

The link between the stator winding and a power output stage of the inverter is of particular interest. In this respect, it is known to construct busbars in connection with a plastic holder to produce a connection between the stator winding and the circuit board or the power output stage of said circuit board. A connection of this kind, however, is very complex. The connection of the stator winding to the power output stage is realized, for example, by means of bent and soldered busbars, which increases the material costs and the production costs.

Because of thermal linking between the stator winding and the inverter, the temperature of the stator is typically measured by an external sensor guided via a plug to the inverter, which is likewise expensive. Furthermore, the temperature is difficult to determine due to complex geometries and multiple bearing arrangements of the busbars with associated transfers of heat.

SUMMARY

The teachings of the present disclosure may simplify an electrical connection of the type described above and the production thereof. For example, some embodiments include a connection between a winding (6) for an electric machine (1) and a circuit board (8) for an inverter (3), wherein a coil end piece (7) of the stator winding (6), which coil end piece extends in the z direction (z), is welded or connected in a form-fitting manner directly to the circuit board (8) on which a power output stage (9) of the inverter (3) is located.

In some embodiments, the circuit board (8) forms a connecting section (11), which is elastic in the z direction (z) and to which the coil end piece (7) is welded or connected in a form-fitting manner.

In some embodiments, a sensor (12) for measuring current is soldered onto the connecting section (11).

In some embodiments, the sensor (12) comprises a copper strip or a shunt.

In some embodiments, a further sensor (13) for measuring temperature is soldered onto the connecting section (11).

In some embodiments, the further sensor (13) comprises an NTC temperature sensor or an SMD temperature sensor.

In some embodiments, the copper strip or shunt projects beyond the connecting section (11) and is welded to the coil end piece (7).

Some embodiments include an electric machine (1) comprising an inverter (3) and a connection as described above.

BRIEF DESCRIPTION OF THE DRAWINGS

Various embodiments of the teachings are discussed in more detail below on the basis of the roughly schematic drawing that is not true to scale, in which:

FIG. 1 shows an illustration of a longitudinal section through an electric machine having an electric motor and an inverter, according to teachings of the present disclosure;

FIG. 2 shows a side view of an exemplary embodiment of a connection according to the teachings of the present disclosure; and FIG. 3 shows a plan view of the connection according to FIG. 2.

DETAILED DESCRIPTION

In some embodiments, the connection according between a winding, in particular a stator winding or rotor winding, for an electric machine and a circuit board for an inverter is characterized, in particular, in that a coil end piece of the winding, in particular the stator winding or the rotor winding, which coil end piece extends in the z direction, is welded or connected in a form-fitting manner directly to the circuit board on which a power output stage of the inverter is located. The coil end piece can form, in particular, a constituent part of a phase terminal connection of the end winding, wherein typically a plurality of phase terminal connections each having one coil end piece are provided in an electric machine, which phase terminal connections can be connected to the circuit board of the inverter by the connection.

In some embodiments, the circuit board of the inverter can comprise, in particular, a power electronics system and a power output stage of the inverter. The z direction can run, in particular, parallel to a longitudinal axis of the electric machine or an electric motor of the electric machine. Due to the direct welding or form-fitting connection of the coil end piece to the circuit board, expensive busbars or expansion loops can be omitted.

In addition, the number of welding and soldering points between the coil end piece and the circuit board, in particular the power output stage of said circuit board, can be reduced, which makes it possible to reduce possible faults and line resistances. In addition, a significantly simplified production process is created.

In some embodiments, the circuit board forms a connecting section, which is elastic in the z direction and to which the coil end piece is welded or connected in a form-fitting manner. For example, the connecting section can assume the form of a lug or tongue that is elastic in the z direction and can be produced by milling out of the circuit board. This embodiment contributes to absorbing mechanical stresses, which arise in the z direction due to a temperature-dependent expansion of the material of the coil end piece, in particular copper, by virtue of an elasticity of the connecting section with respect to the remaining part of the circuit board being produced. This embodiment thus makes it possible to mechanically decouple the phase terminal connections from the circuit board.

In some embodiments, there is a sensor for current measurement to be soldered onto the connecting section. The connecting section for each phase terminal connection should be kept as short as possible in order to minimize a line resistance. According to this embodiment, the space on the connecting section is used in optimum fashion to use the resistance for current measurement. This contributes to the integration of a peripheral current measurement of the stator winding into the circuit board. In some embodiments, the sensor comprises a copper strip or a shunt, which are particularly well suited to the current measurement.

In some embodiments, a further sensor for temperature measurement can likewise be soldered onto the connecting section. Conclusions can be drawn about the temperature of the stator winding by means of a measured temperature in the region of the connecting section. This contributes to the integration of a peripheral temperature measurement of the stator winding into the circuit board. A separate connection of the further sensor to the circuit board by means of a plug can be omitted. In some embodiments, the further sensor comprises an NTC temperature sensor or an SMD temperature sensor, which are particularly well suited to the temperature measurement.

In some embodiments, the copper strip or the shunt can project beyond the connecting section and be welded to the coil end piece. This ensures a particularly stable linking of the sensor since certain material of the circuit board or of the connecting section cannot be welded directly in some circumstances. In some embodiments, an electric machine comprises an inverter and a connection described above.

FIG. 1 shows an electric machine 1 having an electric motor 2 and an inverter 3. The electric motor 2 has a rotor 4, which rotates around a longitudinal axis L, and a stator 5. The stator 5 comprises a stator winding 6 and phase terminal connections having coil end pieces 7, which run in a z direction parallel to the longitudinal axis L. One of the coil end pieces 7 is illustrated in FIG. 1. The inverter 3 comprises a circuit board 8, which contains a power output stage 9. The coil end pieces 7 are connected to the circuit board 8 by means of a connection shown by FIGS. 2 and 3.

FIGS. 2 and 3 show the coil end piece 7 and the circuit board 8, which has a milled-out portion 10. Owing to the milled-out portion 10, a connecting section 11 of the circuit board 8, which connecting section is elastic in the z direction, is formed in the form of an elastic lug or an elastic tongue. The coil end piece 7 is welded directly to the connecting section 11. This produces the connection between the stator winding 6 and the circuit board 8.

The connecting section 11, which is elastic in the z direction, can absorb mechanical stresses, which arise due to a temperature-dependent expansion of copper of the coil end piece 7. This can produce an elasticity of the connecting section 11 with respect to the remaining part of the circuit board 8. A sensor 12, for example in the form of a copper strip or a shunt, is soldered onto the connecting piece 11. The sensor 12 is configured to measure current intensities in the region of the connecting piece 11.

Furthermore, a further sensor 13, for example in the form of an NTC temperature sensor or an SMD temperature sensor, is soldered onto the connecting piece 11. The further sensor 13 is configured to measure temperatures in the region of the connecting piece 11.

The temperature of the stator winding 6 can be deduced by means of a measured temperature. Since certain material of the circuit board 8 cannot be welded directly, the sensor 12 that is soldered on can project a little beyond the connecting piece 11 of the circuit board 8 and be welded directly to the coil end piece 7.

What is claimed is:

1. An electric machine comprising:
   an electric motor with a rotor and a stator, the rotor mounted to rotate around a longitudinal axis;
   an inverter having a power output stage; and
   the stator comprising a stator winding with at least one coil and a coil end piece extending parallel to the longitudinal axis;
   a circuit board for the inverter; and
   a connection between the coil end piece and the circuit board;
   the coil end piece of the stator winding is welded or connected in a form-fitting manner directly to a connecting section of the circuit board on which the power output stage of the inverter is located, the connecting section elastic along the longitudinal axis.

2. The electric machine as claimed in claim 1, wherein:
   the circuit board forms a connecting section to which the end of the conductor is welded or connected;
   the connecting section including a lug or a tongue elastic in the first direction.

3. The electric machine as claimed in claim 2, further comprising a sensor for measuring current, the sensor soldered onto the connecting section.

4. The electric machine as claimed in claim 3, wherein the sensor comprises a copper strip or a shunt.

5. The electric machine as claimed in claim 4, wherein the sensor projects beyond the connecting section and is welded to the end of the conductor.

6. The electric machine as claimed in claim 2, further comprising a second sensor for measuring temperature, the second sensor soldered onto the connecting section.

7. The electric machine as claimed in claim 6, wherein the further sensor comprises a negative temperature coefficient (an NTC) temperature sensor or a surface mounted device (an SMD) temperature sensor.

* * * * *